United States Patent [19]

Gruber et al.

[11] 4,203,415
[45] May 20, 1980

[54] HEAT EXCHANGER

[76] Inventors: Thomas J. Gruber, 7700 Fairmount Rd., Novelty, Ohio 44072; Harris W. Smith, 16839 Savage Rd., Bainbridge, Chagrin Falls, Ohio 44022

[21] Appl. No.: 896,881

[22] Filed: Apr. 17, 1978

[51] Int. Cl.² .............................................. F24H 3/02
[52] U.S. Cl. ................................................. 126/110 R
[58] Field of Search ....... 126/110 R, 110 AA, 110 D, 126/110 E

[56] References Cited

U.S. PATENT DOCUMENTS

| 3,822,991 | 7/1974 | Mutchler | 126/110 B |
| 3,894,526 | 7/1975 | Kofink | 126/110 B |

Primary Examiner—Albert W. Davis
Attorney, Agent, or Firm—Fay & Sharpe

[57] ABSTRACT

A new and improved heat exchanger of the cross over type which facilitates heating an air flow directed either axially or transversely of the heat exchanger itself. The exchanger is comprised of an inner shell which defines a heating chamber for a fuel burner and an outer shell which is coaxially received over the inner shell in a radially spaced apart relationship therewith. The generally annular area between the inner and outer shells defines an air flow passage with the air flow to be heated being primarily conveyed through this air flow passage. A cross over member extends across the air flow passage to provide gaseous flow communication between the heating chamber and a gaseous flow chamber associated with the outer shell. This arrangement facilitates continuously conveying the products of combustion outwardly from the heating chamber. A thin air deflector surrounds the cross over member and is disposed in the air flow passage generally parallel to both the inner and outer shells. This air deflector acts as a heat sink and promotes laminar air flow around the cross over member. The outer shell also includes a pair of oppositely disposed elongated slot-like openings disposed in registry with at least a portion of the inner shell. The heat exchanger may be advantageously mounted either axially or transversely of an air flow to be heated. When axially mounted, at least a portion of the air flow is axially through the air flow passage and when transversely mounted, at least a portion of the air flow is transversely through the air flow passage between the slot-like openings in the outer shell.

13 Claims, 6 Drawing Figures

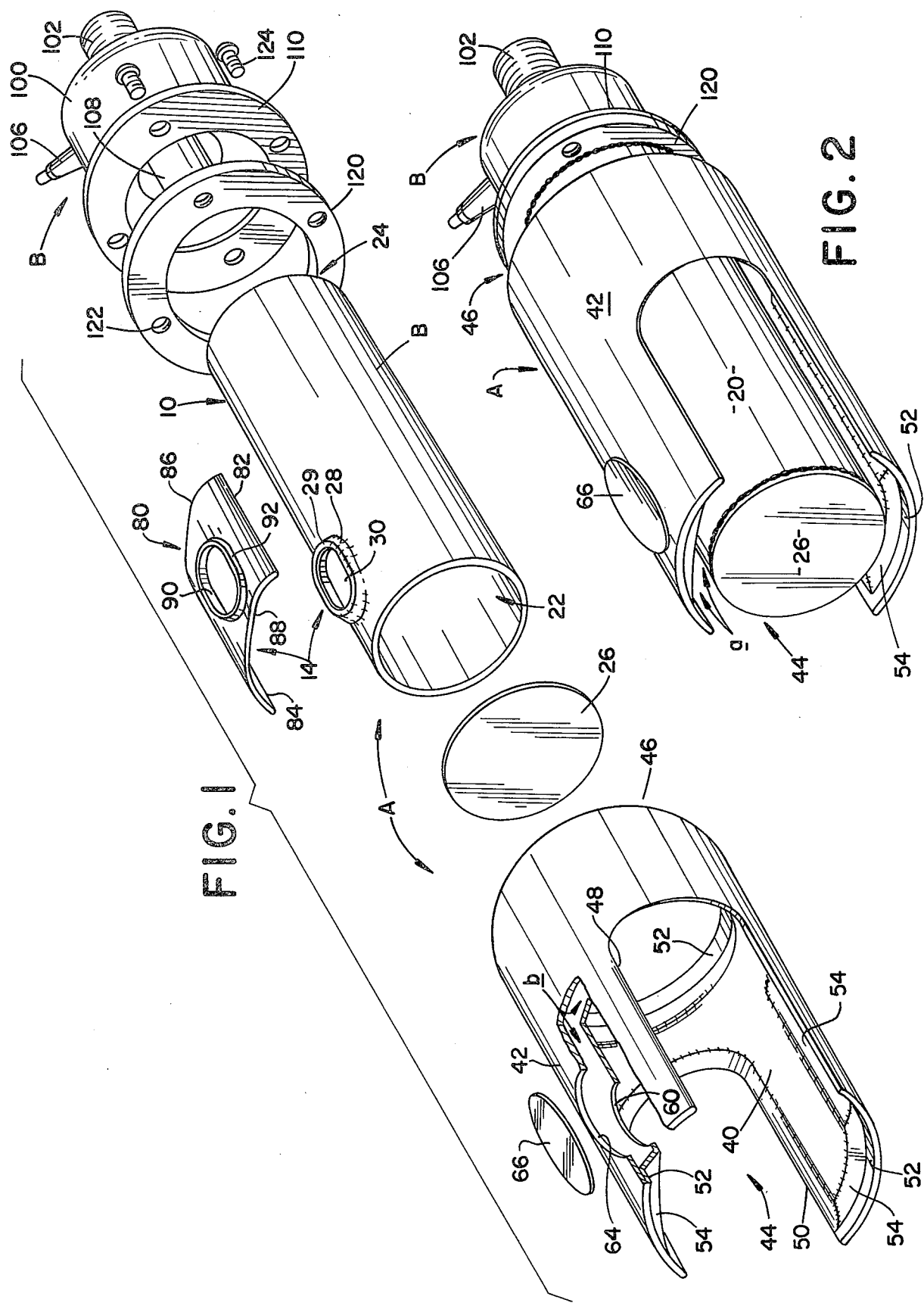

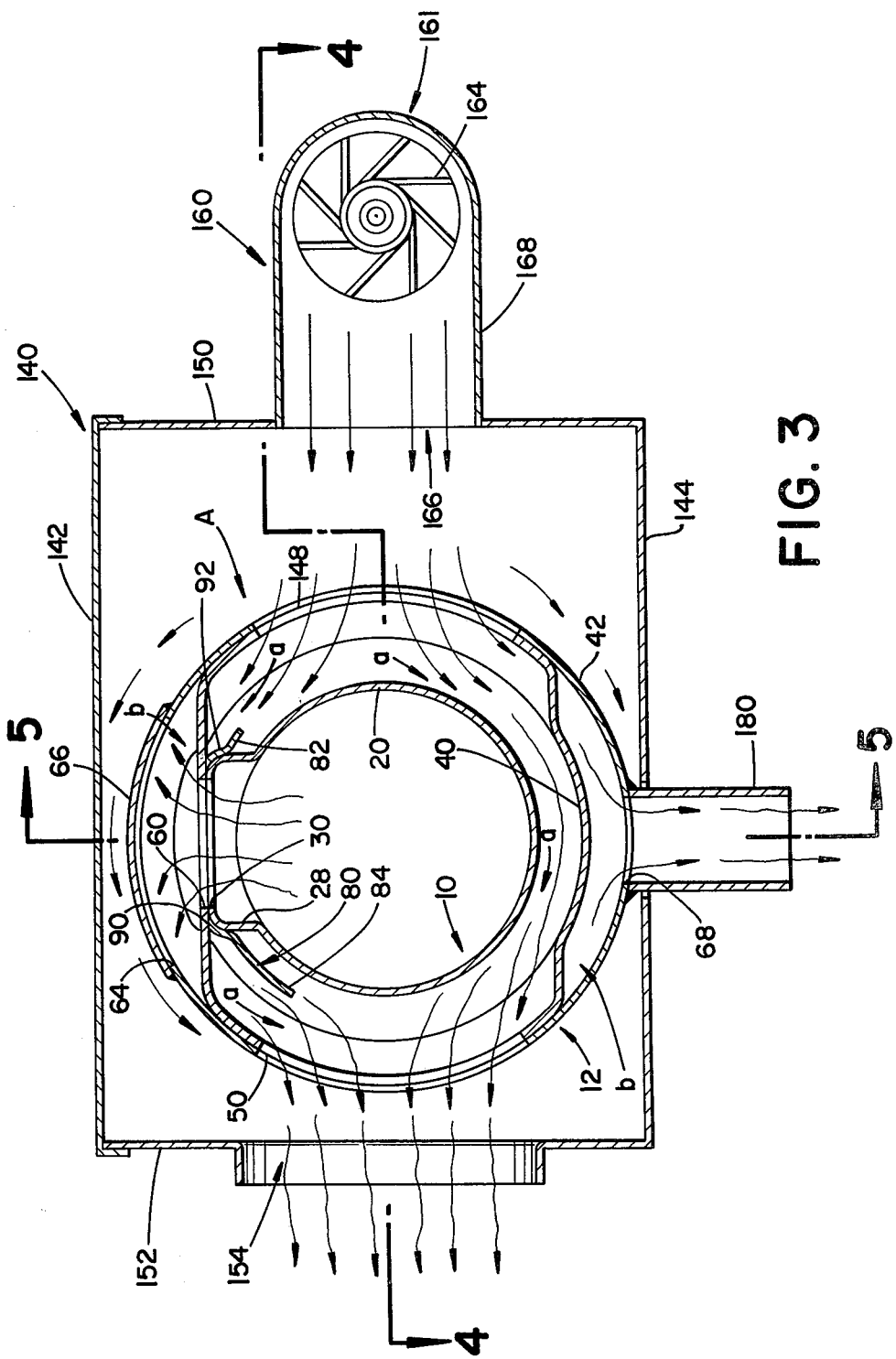

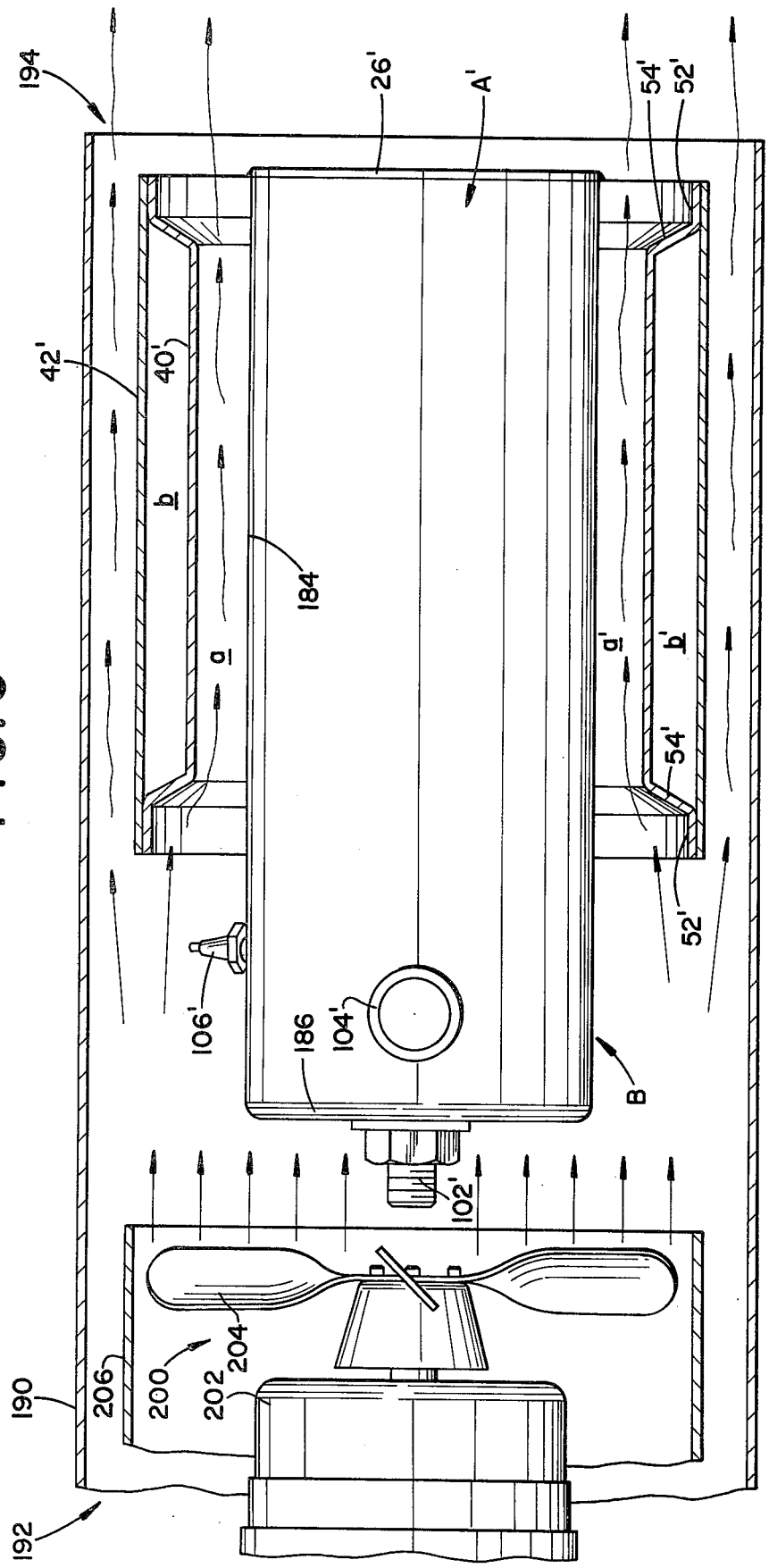

4,203,415

HEAT EXCHANGER

BACKGROUND OF THE INVENTION

This invention pertains to the art of heat exchangers and more particularly to heat exchangers used for heating a flow of air passed in close communication therewith.

The invention is particularly applicable to a heat exchanger of the cross-over type which may be either axially or transversely mounted relative to an air flow and will be described with particular reference thereto. However, it will be appreciated by those skilled in the art that the invention has broader applications and uses.

Heat exchangers of the cross-over type employed for heating a continuous flow of air passed in close proximity thereto have been known in the art. Generally, this type of heat exchanger design includes some type of inner shell which defines a heating chamber and which is adapted to receive a burner in operative association therewith for causing combustion of a continuous fuel supply therein. Surrounding this inner shell and radially spaced therefrom is an outer shell with the space between the inner and outer shells defining an air flow passage. The outer shell includes one of various means for defining a gaseous flow passage or chamber thereover and which passage or chamber is placed in gaseous flow communication with the heating chamber through one or more cross over members or areas. This arrangement allows the products of combustion generated in the heating chamber to be conveyed therefrom by means of the cross over member or area into the gaseous flow passage or chamber and then exhausted outwardly of the heat exchanger structure. An air flow to be heated is continuously directed by fan means or the like through at least the air flow passage into close proximity with the inner and outer shells for heating and subsequent dispersement for heating a room, other enclosure or the like.

However, prior heat exchangers of this general type have had several drawbacks. First, the designs have been such that they were adapted to provide heating for an air flow passed in only a single direction relative to the heat exchanger. Typically, this direction was axially of the exchanger and air flow passage but there have been some exchanger designs adapted for transverse mounting relative to an air flow. However, no prior heat exchanger designs of this general type have been developed which would successfully facilitate alternative mounting of the heat exchanger either axially or transversely of an air flow. Thus, for different heat exchanger applications, i.e., where it was necessary or desirable for some reason to mount a heat exchanger in one direction or another relative to an air flow, different heat exchanger designs and embodiments had to be provided.

Another problem with prior heat exchanger designs of this general type has been in the conveyance of the products of combustion from the heating chamber, through the cross over member or area and then through the passage or chamber in the outer shell to an exhaust area. In view of the fact that the products of combustion are hot and provide an additional vehicle for heating an air flow, it is desirable to provide a sinuous travel path for the products of combustion along the passage or chamber in the outer shell to achieve a more efficient air flow heating arrangement. However, prior art heat exchangers have not fully capitalized on this desirable arrangement and, quite often, simply provided a simple or direct gaseous flow path to the exhaust area.

Still another problem area with prior heat exchangers of this general type has been in accommodating flow through the air flow passage around the cross over member or area itself. Because this cross over member or area is oftentimes located directly in the air flow path and conveys the very hot products of combustion from the heating chamber to the gaseous flow passage or chamber in the outer shell, a substantial heat build-up is present at the cross over area. Because of this heat build-up, it was necessary to utilize special and costly heat resistant metals or materials for constructing the cross over member in order to avoid breakdown of the heat exchanger at this area. Moreover, the cross over member comprises an impediment to smooth air flow along the air flow passage and reduces the overall heat exchanger efficiency. Thus, the amount of fuel and electrical power required to achieve a desired heat exchanger rating is higher than it might otherwise be.

The subject invention contemplates new and improved apparatus which overcomes all of the above referred to problems and which provides a new heat exchanger structure of the cross over type which is simple in design, economical to manufacture, provides increased heating efficiencies by fully utilizing the heated products of combustion, provides an improved air flow around and a heat sink at the cross over member or area and which is readily adapted to mounting either axially or transversely of an air flow to be heated.

BRIEF DESCRIPTION OF THE INVENTION

In accordance with the present invention, there is provided a new heat exchanger construction adapted to be mounted in one of an axial and transverse disposition relative to and in the path of a flow of air which is to be heated. The heat exchanger is comprised of an elongated hollow inner shell having a side wall, a closed inner end and an outer end and defining a heating chamber therein. The outer end is adapted to have a fuel burner disposed in operative association therewith for causing combustion of a continuous fuel supply introduced into the burner and passing generally axially through the heating chamber toward the closed inner end. An elongated outer shell is disposed generally coaxially around the inner shell and radially spaced therefrom to define an air flow passage. The outer shell has first and second ends and spaced apart inner and outer walls with the inner and outer walls being sealed at the terminal edges thereof to define a gaseous flow chamber therebetween for the products of combustion generated in the heating chamber. As a result of this structure, at least an air flow passing into the air flow passage at a first temperature may be heated to a second temperature elevated from the first by transfer thereto of heat generated in the heating chamber and in the gaseous flow chamber. Means for defining a gaseous flow channel or cross over area communicates between the heating chamber from adjacent the closed inner end thereof and the gaseous flow chamber for conveying the products of combustion generated in the heating chamber across the air flow passage and into the gaseous flow chamber. A gaseous flow outlet communicates with the gaseous flow chamber at a position thereon spaced from the channel defining means or cross over area for conveying or exhausting products of combustion outwardly from the gaseous flow chamber. The outer shell also includes at least a pair of openings extending generally transversely through the inner and outer walls thereof in registry with at least a portion of the inner shell. With this construction, the heat exchanger may be mounted axially of an air flow with the air flow being heated from the first to the second temperature as it flows axially through the air flow passage or may be mounted transversely of an air flow with the air flow being heated from the first to the second temperature as it flows generally transversely through the air flow passage between the pair of openings in the outer shell.

In accordance with another aspect of the present invention, the channel defining means and outlet are disposed in communication with the gaseous flow chamber on opposite sides of the outer shell. The at least a pair of openings in the outer shell comprise slot-like areas generally oppositely disposed from each other intermediate the channel defining means and the outlet. With this particular arrangement, the products of combustion passing from the heating chamber into the gaseous flow chamber through the channel defining means may follow a serpentine flow path through the gaseous flow chamber to the outlet or exhaust area.

In accordance with another aspect of the present invention, the heat exchanger includes a thin air flow deflector disposed in the air flow passage intermediate the inner and outer shells and surrounds the channel defining means. This deflector extends generally parallel to the inner and outer shells and at least acts as means for efficiently conveying the air flow axially or transversely of the heat exchanger through the air flow passage around the channel defining means.

In accordance with still another aspect of the present invention, an improvement is provided for a heat exchanger of the type having a generally cylindrical inner shell defining a heating chamber and an outer generally cylindrical shell coaxially disposed relative to and radially spaced from the inner shell thereby defining generally annular air flow passage between the inner and outer shells for heating a flow of air passing therethrough with the outer shell including means for conveying products of combustion generated in the heating chamber by a fuel burner and with the heating chamber and conveying means being placed in gaseous flow communication with each other across the air flow passage by a cross over member or area. The improvement comprises a thin air flow deflector surrounding the cross over member or area in the air flow passage intermediate the inner and outer shells for at least efficiently conveying air flow in the air flow passage around the cross over member or area.

In accordance with a still further aspect of the present invention, there is provided an improvement for a heat exchanger of the type employed to heat a continuous flow of air passing between the outer side wall of an inner shell defining a heating chamber and the inner side wall of an outer shell which surrounds the heating chamber wherein heat is continuously transferred at least from the outer side wall of the heating chamber to the continuous flow of air for subsequent distribution for heating enclosed areas and the like. The improvement is designed to permit mounting of the heat exchanger either axially or transversely of the air flow and comprises the inner and outer shells being generally coaxially disposed relative to each other with the outer shell inner wall spaced from the inner shell outer wall so as to define an air flow passage therebetween over the axial lengths thereof whereby the flow of air may be selectively directed axially of the heat exchanger through the air flow passage for heating purposes. Further, the outer shell includes at least a pair of openings passing therethrough in registry with at least a portion of the inner shell whereby the flow of air may be selectively directed transversely of the heat exchanger through the air flow passage between the openings.

The principal object of the present invention is the provision of a new and improved heat exchanger of the cross over type which is simple in design and construction.

Another object of the present invention is the provision of a heat exchanger of the cross over type which is efficient in operation.

Still another object of the present invention is the provision of a heat exchanger of the cross over type which provides means for efficient air flow around the cross over member or area.

Yet a further object of the present invention is a heat exchanger of the cross over type wherein the exchanger may be selectively mounted either axially or transversely of an air flow which is to be heated.

DESCRIPTION OF THE DRAWINGS

The invention may take physical form in certain parts and arrangements of parts, preferred embodiments of which will be described in detail in the specification and illustrated in the accompanying drawings which form a part hereof and wherein:

FIG. 1 is an exploded perspective view of the subject heat exchanger with a portion thereof broken away for ease of illustration;

FIG. 2 is a perspective view showing the heat exchanger of FIG. 1 in the assembled condition;

FIGS. 3-5 show various cross-sectional views of the heat exchanger when mounted to accommodate an air flow transverse of the exchanger; and, FIG. 6 shows the heat exchanger mounted to accommodate air flow axially thereof and also shows a slightly modified structural arrangement for the heat exchanger inner shell and burner body.

DESCRIPTION OF THE PREFERRED EMBODIMENT

Figure 4:
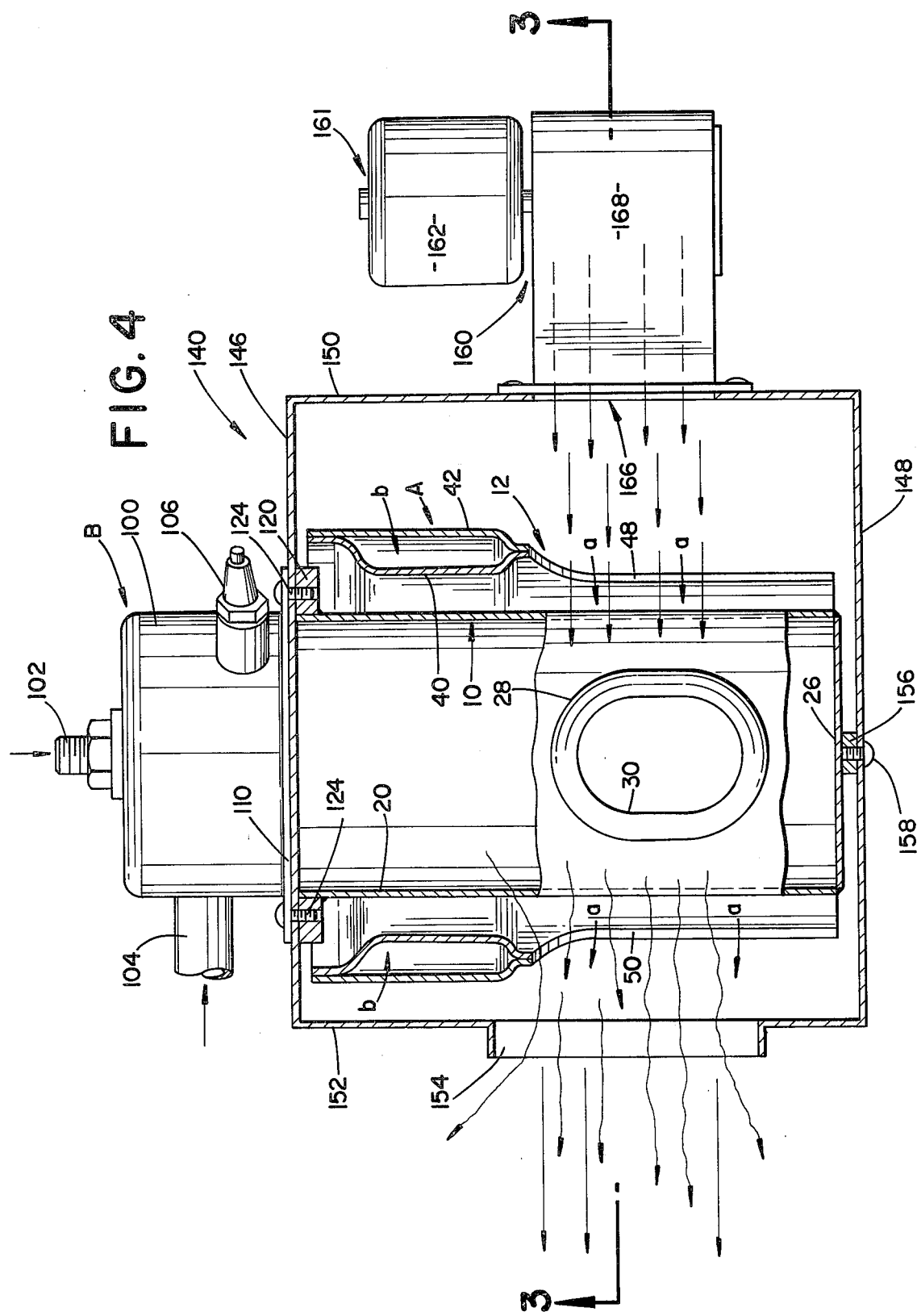

Referring now to the drawings wherein the showings are for purposes of illustrating the preferred embodiment of the invention only and not for purposes of limiting same, the FIGURES show a heat exchanger A which receives a fuel burner B in close spaced operative association therewith.

With particular reference to FIGS. 1 and 2, heat exchanger A is basically comprised of a cylindrical inner shell generally designated 10, a cylindrical outer shell generally designated 12 which is coaxially received over the inner shell and a cross over member with deflector generally designated 14. These components are constructed from high temperature resistant sheet steel in order to accommodate the high operating temperatures and further, are of welded construction as will be further described and appreciated hereinafter.

Inner shell 10 is comprised of an elongated cylindrical side wall 20 having open inner and outer ends 22,24. A cover or end plate 26 is rigidly affixed to side wall 20 at inner end 22 so as to close that end and provide the inner shell with a generally cup-shaped configuration. The inside of inner shell 10 defines a heating chamber which is used in a manner to be hereinafter described.

Formed directly into side wall 20 is an outwardly extending boss area 28 terminating in a slightly curved top wall area 29 (FIG. 5) defining a generally oval opening 30 therethrough communicating with the heating chamber itself. While a number of manufacturing techniques may be employed for manufacturing side wall 20, it is constructed from a flat piece of sheet steel which is rolled or formed into the cylindrical configuration and then welded along a longitudinally extending seam area. Boss area 28 may be conveniently provided in the side wall by conventional metal working techniques such as drawing and its outward extension from side wall 20 is such that it defines a cross over area and receives an air deflector in a manner to be described hereinafter.

Outer shell 12 is comprised of an inner cylindrical member 40 defining an inner wall and an outer cylindrical member 42 defining an outer wall. Members 40,42 are coaxially and coextensively disposed relative to each other and have a first end 44 and a second end 46. As will be particularly noted from FIG. 1, the inner and outer cylindrical members are diametrically dimensioned such that there is an annular space between them when they are coaxially disposed relative to each other. Moreover, the inner diameter of outer shell 12 is greater than the outer diameter of inner shell 10 for defining an air flow passage which will be described in greater detail. Extending inwardly from first end 44 longitudinally toward second end 46 are a pair of generally U-shaped slot areas 48,50 which pass through both cylindrical members 40,42. While a number of different types and styles of slots could be employed, the generally U-shaped configuration is preferred. Moreover, these slots are substantially identical to each other in size and shape and preferably extend from first end 44 toward second end 46 over at least slightly more than one half of the length of outer shell 12. Also, each of the opposed slots 48,50 has a width slightly under one fourth of the circumference of outer shell 12. These length and width dimensions may be varied as desired or necessary without in any way affecting the scope and intent of the invention.

As will be particularly noted from FIGS. 1 and 6, inner cylindrical member 40 is formed so as to include flange areas generally designated 52 adjacent the terminal edges thereof forming border areas which are rigidly affixed to the associated terminal edges of outer cylindrical member 42. With this contruction, outer shell 12 comprises a basically hollow structure with the two cylindrical members 40,42 connected together adjacent the mutually associated terminal edges thereof. Generally outwardly extending transition areas 54 connect the main portion of cylindrical member 40 and flange areas 52 for defining end walls in the outer shell 12 structure. Both inner and outer cylindrical members 40,42 are constructed from sheet metal material, formed into a cylindrical configuration and then joined along a longitudinal seam. Moreover, flange and transition areas 52,54 of the inner cylindrical member may be formed by conventional metal working techniques. The longitudinal seams and interconnection between members 40,42 at flange areas 52 may be advantageously performed by conventional welding techniques. Disposed intermediate slots 48,50 in cylindrical member 40 is a generally oval opening 60. Opening 60 is generally compatible in size and shape with opening 30 in boss 28 of inner shell 10.

Oppositely disposed from opening 60 in outer cylindrical member 42 is slightly larger opening 64. This opening facilitates assembly of the overall heat exchanger structure as will become more readily apparent hereinafter. A cover 66 is provided for opening 64 and may be conveniently welded thereto by conventional welding techniques once the necessary assembly process through the opening has been completed. An exhaust opening 68 (FIGS. 3 and 5) is oppositely disposed from opening 64 in cylindrical member 42. Use of this exhaust opening will be discussed in greater detail hereinafter.

With continued reference to FIG. 1, an air deflector 80 provides improved air flow characteristics during use of the heat exchanger and includes a leading edge 82, a trailing edge 84 and opposed side edges 86,88. A generally centrally located oval opening 90 passes through the air deflector and is surrounded by a mounting flange 92. Opening 90 and mounting flange 92 are dimensioned so as to be closely received over boss 28 for practical mounting and for operational reasons which will become apparent hereinafter. In addition to providing improved air flow characteristics, deflector 80 acts as a heat sink in a manner to be described. Moreover, it is also possible to construct deflector 80 to eliminate mounting flange 92 and simply dimension opening 90 to be closely received over boss 28.

Figure 5:
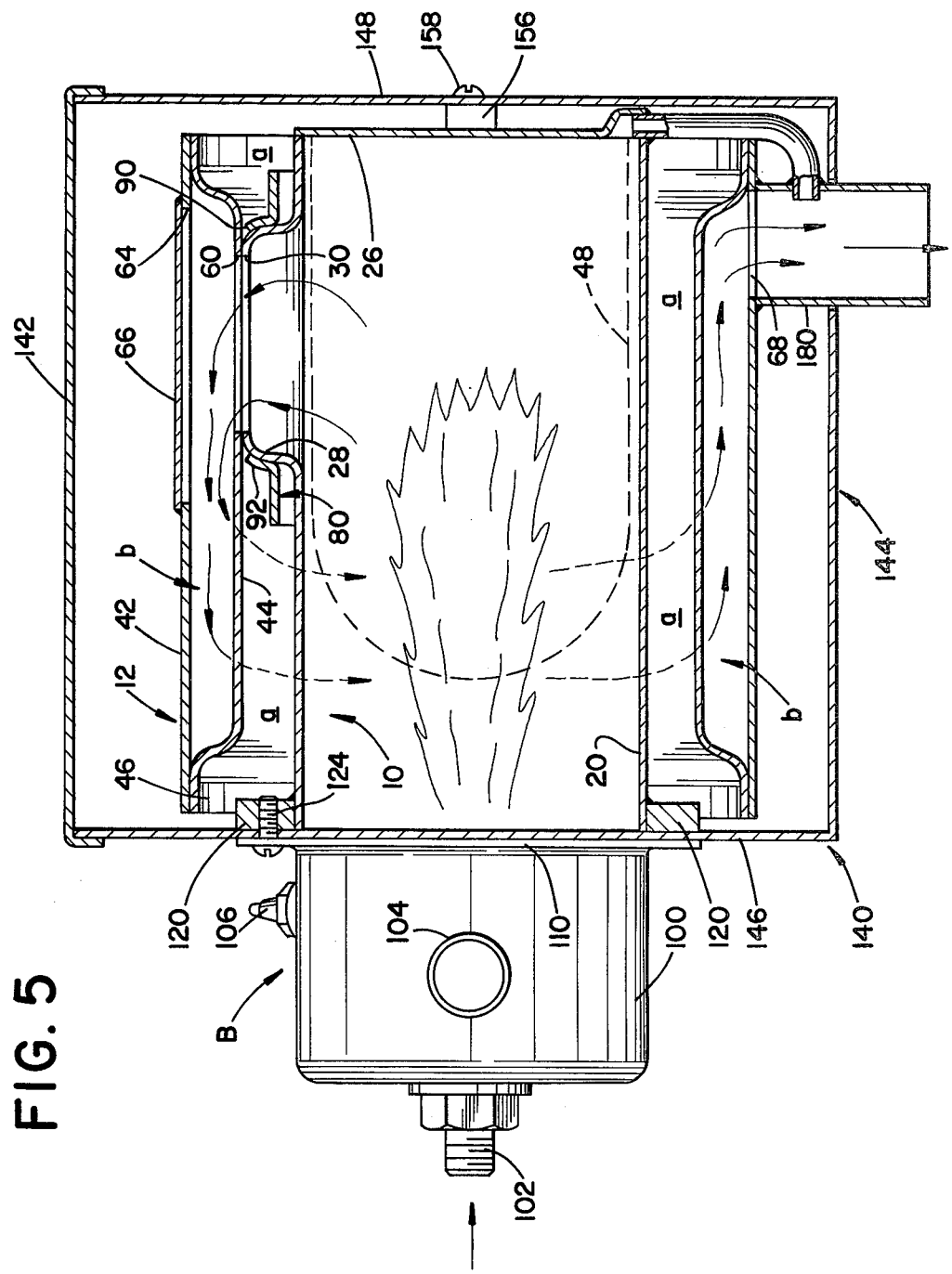

Still with particular reference to FIG. 1, fuel burner B is adapted for mounting in an operative relationship with the exchanger at open outer end 24 of inner shell 10. The burner has a burner body 100 and includes fuel and air inlets 102 and 104 (FIGS. 4 and 5). An ignitor generally designated 106 penetrates the side of the burner for igniting the mixture of fuel and air received through inlets 102,104 into a combustion nozzle 108. As the specifics of construction, fueling and operation of such burners are deemed known in the art, further elaboration thereon is deemed unnecessary for a full and complete understanding of the subject invention. The burner in and of itself, however, does not comprise a part of the heat exchanger per se but rather, is necessary for operation and use thereof. Body 100 of burner B includes an outwardly disposed flange 110 (FIGS. 4 and 5) which may be conveniently used to mount the burner to a mounting flange generally designated 120 which itself is mounted in a manner described hereinafter. This mounting flange has a plurality of mounting openings 122 spaced therearound to receive conventional mechanical fasteners 124 for the actual mounting operation as is best shown, for example, in FIGS. 4 and 5. It is also possible to form burner body 110 integral with inner shell 10 in a manner described hereinafter and shown with reference to FIG. 6.

With particular reference to both FIGS. 1 and 2, the above described and discussed individual components are mounted relative to each other in a manner so as to form the final heat exchanger structure shown in FIG. 2. More particularly, outer shell 12 is coaxially disposed over inner shell 10 and since the inner diameter of outer shell 12 is greater than the outer diameter of inner shell 10, an annular air flow passage generally designated a is formed between the two shells. The inner and outer shells are positioned such that first end 44 of the outer shell is generally coextensive with the inner end of the inner shell as defined by cover or end plate 26. Second end 46 of the outer shell is generally coextensive with the outer end 24 of the inner shell although, preferably, outer end 24 extends slightly outwardly of second end 46. In this arrangement, U-shaped slots 48,50 are disposed in registry with a portion of the inner shell side wall 20. This is deemed important from an operational standpoint for reasons which will be more fully described. As used hereinafter, axial flow is deemed to be generally longitudinally of the heat exchanger between ends 46,44 and transverse air flow is deemed to be generally normal thereto.

The only place of interconnection between inner and outer shells 10,12 is at boss areas 28. More particularly, air deflector 80 is received over the boss and rigidly affixed thereto with the two shells being rigidly joined together about openings 30,60. FIG. 5 best shows this particular arrangement where bosses 28 receives the air deflector through opening 90 with mounting flange 92 closely positioned about the boss adjacent the outer end thereof and with openings 30,60 placed in registry with each other. A strong joint is necessary at this area and conventional welding techniques may be advantageously employed. The access provided through opening 64 is considered to be desirable for this particular assembly operation. The joint or interconnection between the inner and outer shells is such that the heating chamber defined on the inside of inner shell 10 is placed into gaseous flow communication with a gaseous flow chamber b defined between inner cylindrical members 40,42 and which chamber is also placed into flow communication with exhaust opening 68 as described hereinabove. The combination of boss 28 with its opening 30 and opening 60 in inner cylindrical member 40 passing therethrough define a cross over member or area. However, other arrangements for achieving a cross over member or area could also be utilized. Mounting flange 120 may be conveniently mounted to the heat exchanger structure at open outer end 24 of inner shell 10 by, for example, welding the flange thereto.

In using the concepts of the subject invention, particular attention is invited to FIGS. 3–5 which show the heat exchanger mounted transversely to a flow of air which is to be heated. In these FIGURES, and merely for illustrating one type of heat exchanger installation, the heat exchanger and burner are shown as being operably disposed in a housing design generally designated 140. The housing is configured to include a cover or top wall 142, a bottom wall 144, spaced apart side walls 146,148 and spaced apart end walls 150,152. An outlet generally designated 154 is included in end wall 152 to permit the heated air flow to pass into the area which itself is to be heated thereby. The housing itself may be manufactured from many known and conventional materials and the specific design of the housing may be varied as necessary and/or desirable for accommodating different installation needs.

In the example shown, heat exchanger A and burner B are axially disposed between side walls 146,148 in a manner such that the heat exchanger is fully received in the housing and the burner is disposed outside the housing. To accommodate this arrangement, side wall 146 includes a generally circular opening therethrough. The heat exchanger and burner may be affixed in place relative to the housing by any number of convenient and alternative means. However, in the example housing shown, a portion of side wall 146 adjacent the circular opening is received between burner flange 110 and mounting flange 120 with mechanical fasteners 124 passing therethrough. A spacer or bracket generally designated 156 is interposed between cover or end plate 26 of inner shell 10 and the inside of side wall 148. A mechanical fastener 158 is shown as passing through side bottom wall 148 and into the spacer or bracket to retain the end of the heat exchanger in position. It should also be noted that top and bottom walls 142,144 are fairly closely spaced to outer shell 12 for promoting air flow through the heat exchanger rather than around it. The specific mounting arrangement shown and just described is exemplary for accommodating transverse air flow and, again, may be modified or varied as deemed necessary for a particular application without in any way departing from the intent or scope of the invention.

A fan assembly generally designated 160 (FIGS. 3 and 4) is disposed adjacent end wall 150 for providing a continuous air flow transversely across the heat exchanger. The fan assembly is housed in an assembly housing 161 extending outwardly of side wall 148 and the assembly itself includes a motor generally designated 162 which drives a fan 164 for creating an air flow outwardly from an outlet 166 in the fan housing 168. The specifics of the fan assembly do not form a part of the present invention and are not, therefore, described in any greater detail therein. It will be appreciated by those skilled in the art that many other fan or alternative air flow supply arrangements could also be advantageously employed in practicing the concepts of the subject invention. To complete the general arrangement shown in FIGS. 3–5, an exhaust tube generally designated 180 communicates between exhaust opening 68 in outer cylindrical member 42 of outer shell 12 and bottom wall 144 of housing 140.

In using the structural arrangement of FIGS. 3–5 for heating an air flow, burner B is, of course, provided with appropriate air and fuel supplies through inlets 102,104 as is conventional. Ignitor 106 is connected to an appropriate electrical source so that the combustible fuel mixture passing through nozzle 108 may be continuously ignited. With such a conventional fuel burner hook-up, the burner is placed into operation and the resulting flame as generally schematically shown in FIG. 5 causes a heating action in the heating chamber defined within inner shell 10. Heat thus generated is transferred to the walls of the inner shell itself and the products of combustion from the fuel burner are continuously passed from the heating chamber through openings 30,60 into the gaseous flow chamber.

With particular reference to FIG. 5, the path taken by the gaseous products of combustion is shown by the arrowed lines passing from the heating chamber and into gaseous flow chamber b. Once in gaseous flow chamber b, the products of combustion flow upwardly toward second end 46 of outer shell 12, then circumferentially around the upper portion of the shell, then downwardly toward and out of the chamber at exhaust opening 68 through exhaust tube 180. Thus, the products of combustion take a serpentine path from the entrance area into gaseous flow chamber b at the cross over member or area to the exhaust opening therefrom. In addition to the above description with reference to FIG. 5, the overall serpentine nature for the flow of gaseous products of combustion through chamber b can be best appreciated by viewing the partially cross sectioned outer shell shown in FIG. 1. In FIG. 1 and from the point of entry of the products of combustion into the gaseous flow chamber through opening 60, the gaseous products travel upwardly around U-shaped slots 48,50 and then downwardly toward opening 68 for exhaust from the chamber. Because these products of combustion are also quite hot, they will heat both inner and outer cylindrical members 40,42 during their course of travel through gaseous flow chamber b. Due to the serpentine nature of flow in chamber b, much of the heat in the products of combustion will be effectively transferred to the inner and outer cylindrical members.

Referring now particularly to FIGS. 3 and 4, the arrowed lines originating from fan assembly 160 schematically show the flow of air which is to be heated by being passed into close communication and proximity with the heat exchanger. This air flow is, of course, focused so as to flow transversely of the heat exchanger and is further focused (FIG. 4) so as to flow through slot 48 into air flow passage a defined between inner and outer shells 10,12. From there, the air flows around the inner shell (FIG. 3), then toward and outwardly of passage a at slot 50 and then outwardly of housing 140 at outlet 154 for distribution to heat a room, enclosure or the like.

As the air flow passes through passage a generally transverse of the exchanger, heat is transferred thereby by convection from the outside wall of inner shell 10 and the inside wall of outer shell 12. Thus, when the air flow exits air flow passage a at slot area 50, the temperature thereof is raised from a first ambient temperature as supplied from fan assembly 160 to a second elevated temperature which may then be employed to heat a room, enclosure or the like. Some of the air flow originating at fan assembly 160 will flow around the outside of outer shell 12, i.e., around outer cylindrical member 42. Since the products of combustion heat both inner and outer cylindrical members 40,42, this air will also have been heated to some extent as it flows outwardly of housing 140 through outlet 154.

A particularly advantageous aspect of the present invention is the affect that air deflector 80 has on the air flow passing thereby within air flow passage a. This deflector, best shown in FIGS. 3 and 5 in an operative position, acts to reduce heat build-up at the cross over member or area since through the intimate contact between mounting flange 92 and boss 28, it functions as a fin or heat sink and provides additional surface area for air flow thereover resulting in better heat transfer efficiency. Since the deflector acts to reduce heat buid-up at the cross over member or area, it is not necessary to utilize expensive and extremely high temperature resistant materials for forming the cross over member or area.

Indeed and as noted above, this cross over member or area may be formed from the parent material of shells 10,12 and integral therewith. More importantly, however, the air deflector assists in spreading an acceptable heat gradient over the entire exchanger. In addition to acting as a heat sink, the air deflector improves air flow characteristics across the heat exchanger through passage a so as to minimize turbulence and provide generally laminar air flow on the back side of the deflector adjacent trailing edge 84 thereby increasing the total air flow across the heat exchanger. The particularly advantageous results obtained by using air deflector 80 are in providing a far more efficient heat exchanger structure and adding to the total exposed area available to transfer heat from the cross over member or area. This results in less fuel being used to achieve the final desired heating for an air flow as well as requiring less fuel and electrical power to achieve a desired BTU/hour heat exchanger rating. If the alternative structure for the air deflector which eliminates mounting flange 92 is used, however, the necessary intimate contact between the deflector and boss 28 is not provided to permit it to effectively act as a heat sink.

In addition to installation and use of the heat exchanger in conjunction with an air flow directed generally transversely thereof as shown and described above with reference to FIGS. 3-5, the heat exchanger is readily alternatively adapted to installation and use in an axial air flow environment as shown in FIG. 6. FIG. 6 also shows a slightly modified structural arrangement for the heat exchanger inner shell and the burner body. For ease of illustration and appreciation of this modification, like components are identified by like numerals with a primed (') suffix and new components are identified by new numerals.

In that regard, the heat exchanger inner shell and burner body comprise a single elongated open ended tubular shell 184. Cover or end plate 26' is affixed to one end of this shell and a burner nozzle support plate 186 is affixed to the other end. Fuel nozzle or inlet 102' penetrates plate 186 generally coaxially of shell 184 with air inlet 104' and ignitor 106' radially penetrating the side wall of shell 184 substantially as discussed above with reference to FIGS. 1-5. The connections for inlets 102',104' and ignitor 106' facilitate operation of the burner in a manner as also described above. The remainder of the overall heat exchanger A' construction is as previously described.

In this axial flow embodiment, heat exchanger A' with the integral burner is disposed in an elongated housing generally designated 190 having a lead end 192 and an exit end 194. A fan assembly generally designated 200 includes a motor 202 for driving a fan 204 and which assembly is disposed in a fan housing generally designated 206. During operation of the fan assembly, an air flow is directed from adjacent lead end 192 toward exit end 194 axially of heat exchanger A'. With the heat exchanger and burner operating as hereinabove previously described, a portion of the air flow will pass into air flow passage a' and then pass axially therealong to be heated in the same manner also previously described. In addition, a certain portion of the air flow will pass axially along and in close proximity to the outer side portion of outer cylindrical member 42' and be heated thereby. The heated air flow exiting from exit end 194 of housing 190 may then be utilized for heating a room, enclosure or the like similar to that hereinabove previously described. Moreover, the same advantageous results will be obtained from air deflector 80'. Axial mounting arrangements for the heat exchanger other than that shown in FIG. 6 may be advantageously employed without in any way departing from the intent or scope of the present invention. Moreover, the integrally formed heat exchanger inner shell and burner body shown in this FIGURE could also be advantageously adapted to use in the cross flow environment of FIG. 3-5.

As shown in the FIGURES and described hereinabove in detail, the subject heat exchanger provides an arrangement which may be advantageously employed in heating an air flow directed either axially or transversely of the heat exchanger itself. This structure provides a degree of heat exchanger versatility heretofore not obtainable in prior heat exchanger designs. Because of the overall arrangements of prior designs, they could not be effectively alternatively utilized to heat either axial or transverse air flow. In addition, the subject new heat exchanger provides for improved overall operational efficiency and means for reducing heat build up at the cross over member or area.

The invention has been described with reference to the preferred embodiment. Obviously, modifications and alterations occur to others upon the reading and understanding of this specification. It is intended to include all such modifications and alterations insofar as they come within the scope of the appended claims or the equivalents thereof.

Having thus described the invention, it is now claimed:

1. A heat exchanger construction adapted to be mounted in one of an axial and transverse disposition relative to and in the path of a flow of air which is to be heated thereby, said heat exchanger comprising:

an elongated hollow inner shell having a side wall, a closed inner end and an outer end with said inner shell defining a heating chamber therein, said outer end adapted to have a burner disposed in operative association therewith for causing combustion of a continuous fuel supply introduced into said burner and passing generally axially through said chamber toward said closed inner end;

an elongated outer shell disposed generally coaxially around said inner shell and spaced therefrom to define an air flow passage, said outer shell having first and second ends and spaced apart inner and outer walls with said inner and outer walls being sealed together at least at the terminal edges thereof for defining a gaseous flow chamber therebetween for the products of combustion generated in said heating chamber, whereby at least an air flow passing into said air flow passage at a first temperature may be heated to a second temperature elevated from the first by heat transfer thereto of heat generated in said heating chamber and said gaseous flow chamber;

means defining a gaseous flow channel communicating between said heating chamber from adjacent the closed inner end thereof and said gaseous flow chamber adjacent said outer shell first end for conveying products of combustion generated in said heating chamber into said gaseous flow chamber;

a gaseous flow outlet in said outer shell cummunicating with said gaseous flow chamber adjacent said outer shell first end at a position spaced from said channel defining means for conveying products of combustion outwardly from said gaseous flow chamber; and, at least a pair of generally slot-like areas in said outer shell each extending generally transversely through the inner and outer walls thereof inwardly from at least adjacent said outer shell first end toward said second end in registry with at least a portion of said inner shell whereby said heat exchanger may be mounted axially of an air flow with said air flow being heated from said first to said second temperature as it flows axially through said air flow passage and whereby said heat exchanger may be mounted transversely of an air flow with said air flow being heated from said first to said second temperature as it flows generally transversely through said air flow passage between said at least a pair of slot-like areas, said slot-like areas being generally oppositely disposed from each other intermediate said channel defining means and said outlet whereby products of combustion entering said gaseous flow chamber from said heating chamber through said channel defining means follow a serpentine path through said gaseous flow chamber to said outlet.

2. The heat exchanger as defined in claim 1 further including a thin air flow deflector surrounding said channel defining means in said air flow passage and disposed intermediate said inner and outer shells, said deflector providing means for efficiently conveying an air flow in said air flow passage axially or transversely of said heat exchanger around said channel defining means.

3. The heat exchanger as defined in claim 1 wherein said inner and outer shells have generally cylindrical cross sectional configurations, said heat exchanger further including a thin air flow deflector surrounding said channel defining means intermediate said inner and outer shells, said deflector providing means for efficiently conveying an air flow through said air flow passage either axially or transversely of said heat exchanger around said channel defining means.

4. The heat exchanger as defined in claim 3 wherein said deflector has a generally arcuate configuration over the lateral dimension thereof and is disposed in a generally parallel relationship over the surface thereof with said inner and outer shells for promoting laminar air flow around said channel defining means in air flow directions both axially and transversely of said heat exchanger.

5. The heat exchanger as defined in claim 3 wherein said deflector includes an areas disposed in intimate contact with said channel defining means to permit said deflector to further act as a heat sink.

6. In a heat exchanger of the type having a generally cylindrical inner shell defining a heating chamber and a generally cylindrical outer shell coaxially disposed relative to and spaced radially outward from said inner shell to define a generally annular air flow passage between said inner and outer shells for heating air passing therethrough and wherein said outer shell includes means for exhausting products of combustion generated in said heating chamber by a burner with said heating chamber and exhausting means being placed in gaseous flow communication with each other across said air flow passage by a cross over member, the improvement comprising:

a thin air flow deflector surrounding said cross over member in said air flow passage intermediate said inner and outer shells, said deflector having a generally arcuate configuration over the lateral dimension thereof and disposed to extend generally parallel over the surface thereof to said inner and outer shells for promoting laminar air flow around said cross over member both axially and transversely of said heat exchanger.

7. The improvement as defined in claim 6 wherein said deflector further includes an area disposed in intimate contact with said cross over member for permitting said deflector to act as a heat sink.

8. In a heat exchanger of the type employed to heat a continuous flow of air passing between the outer side wall of an inner shell defining a heating chamber and the inner side wall of an outer shell which surrounds said heating chamber wherein heat is continuously transferred at least from the outer side wall of said heating chamber to said continuous flow of air for subsequent distribution for heating enclosed areas and the like; the improvement comprising:

said inner and outer shells being generally coaxially and coextensively disposed relative to each other with said outer side wall so as to define an air flow passage therebetween over the cooperating axial lengths thereof whereby said flow of air may be selectively directed axially of said heat exchanger through said air flow passage for air heating purposes; and, said outer shell having at least a pair of slot-like areas generally oppositely disposed from each other and passing therethrough generally axially therealong from at least adjacent an outer shell first end toward an outer shell second terminal end in registry with at least a portion of said inner shell whereby said flow of air may be selectively directed transversely of said heat exchanger through said air flow passage between said slot-like areas.

9. A forced air heating system comprising in combination:
   a heating system housing including at least a heated air flow outlet;
   a heat exchanger recieved in said housing including an inner shell having a side wall, a closed inner end and an outer end for defining a heating chamber with an open ended outer shell generally coaxially disposed around said inner shell and radially spaced therefrom so as to define an air flow passage therebetween over the axially cooperative lengths thereof, said outer shell further including at least a pair of elongated slot areas extending therethrough from one terminal end toward the other terminal end in registry with said inner shell and means for exhausting products of combustion generated in said heating chamber, said exhausting means and heating chamber being placed in gaseous flow communication with each other across said air flow passage by a cross over member;
   a fuel burner in operative communication with the outer end of said heating chamber;
   means for supplying fuel to said burner to facilitate combustion within said heating chamber; and,
   means for directing a flow of air to be heated from a first temperature to a second temperature elevated from the first within said system housing and through said air flow passage in one of an axial and transverse direction relative to said heat exchanger and then outwardly of said housing through said outlet wherein in said axial direction said directing means and heat exchanger are disposed such that at least a portion of said flow of air is directed from adjacent said heating chamber outermost end axially through said air flow passage and wherein in said transverse direction said directing means and heat exchanger are disposed such that at least a portion of said flow of air is directed transversely through said air flow passage between said pair of elongated slot areas in said outer shell.

10. The system as defined in claim 9 wherein said outer shell has first and second ends with said outer shell first end being generally coextensive with said inner shell closed inner end and said outer shell second end, said at least a pair of elongated slot areas comprising a pair of oppositely disposed slot areas extending from said outer shell first end toward said second end.

11. The system as defined in claim 9 further including a thin air flow deflector surrounding said cross over member in said air flow passage intermediate said inner and outer shells, said deflector providing means for efficiently conveying said air flow in said air flow passage axially or transversely of said heat exchanger around said cross over member.

12. A forced air heating system comprising in combination:
    a heating system housing including at least a heated air flow outlet;
    a heat exchanger received in said housing including a generally cylindrical inner shell having a side wall, a closed inner end and an outer end for defining a heating chamber with an open ended generally cylindrical outer shell generally coaxially disposed around said inner shell and radially spaced therefrom so as to define an air flow passage therebetween over the axially cooperative lengths thereof, said outer shell further including at least a pair of openings extending therethrough in registry with said inner shell and means for exhausting products of combustion generated in said heating chamber, said exhausting means and heating chamber being placed in gaseous flow communication with each other across said air flow passage by a cross over member;
    a thin air flow deflector surrounding said cross over member in said air flow passage intermediate said inner and outer shells, said deflector having a generally arcuate configuration over the lateral dimension thereof and being disposed in a generally parallel relationship over the surface thereof relative to said inner and outer shells for promoting laminar air flow around said cross over member both axially and transversely of said heat exchanger;
    a fuel burner in operative communication with the outer end of said heating chamber;
    means for supplying fuel to said burner to facilitate combustion within said heating chamber; and,
    means for directing a flow of air to be heated from a first temperature to a second temperature elevated from the first within said system housing and through said air flow passage in one of an axial and transverse direction relative to said heat exchanger and then outwardly of said housing through said outlet.

13. The system as defined in claim 12 wherein said deflector includes an area disposed in intimate contact with said cross over member to permit said deflector to further act as a heat sink.

* * * * *

UNITED STATES PATENT AND TRADEMARK OFFICE
CERTIFICATE OF CORRECTION

PATENT NO. : 4,203,415
DATED : May 20, 1980
INVENTOR(S) : Thomas J. Gruber; Harris W. Smith It is certified that error appears in the above—identified patent and that said Letters Patent is hereby corrected as shown below:

In the patent heading, the following patent assignment data is added following the line identified as [76] Inventor:

Assignee: Hunter Investment Company
                  Cleveland, Ohio

Signed and Sealed this

Nineteenth Day of August 1980

[SEAL]

Attest:

SIDNEY A. DIAMOND

*Attesting Officer*      *Commissioner of Patents and Trademarks*